United States Patent [19]

Kletzkine et al.

[11] Patent Number: 4,580,266
[45] Date of Patent: Apr. 1, 1986

[54] METHOD OF RADIO TELECOMMUNICATION AND DEVICE FOR IMPLEMENTATION THEREOF

[75] Inventors: Richard Kletzkine, Ribecourt; Pierre Makowski, Noyon, both of France

[73] Assignee: Societe Electronique du Nord-Est Parisien Seinep, Chiry Ourscamps, France

[21] Appl. No.: 499,760
[22] PCT Filed: Aug. 18, 1982
[86] PCT No.: PCT/FR82/00136
 § 371 Date: May 16, 1983
 § 102(e) Date: May 16, 1983
[87] PCT Pub. No.: WO83/01164
 PCT Pub. Date: Mar. 31, 1983

[30] Foreign Application Priority Data

Sep. 16, 1981 [FR] France .................................. 81 17465

[51] Int. Cl.⁴ .......................... H04J 6/00; H04Q 9/00
[52] U.S. Cl. .................................. 371/57; 340/825.5; 370/85; 455/58
[58] Field of Search .................. 371/32, 33, 34, 57; 340/825.5; 364/710; 455/57, 58; 370/85

[56] References Cited

U.S. PATENT DOCUMENTS

| 2,731,622 | 1/1956 | Doremus et al. | 455/58 X |
|---|---|---|---|
| 3,995,258 | 11/1976 | Barlow | 371/34 X |
| 4,013,959 | 3/1977 | Patterson | 455/58 |
| 4,093,823 | 6/1978 | Chu | 371/33 X |
| 4,281,380 | 7/1981 | De Mesa, III et al. | 340/825.5 |
| 4,292,623 | 9/1981 | Eswaran et al. | 340/825.5 |
| 4,347,498 | 8/1982 | Lee et al. | 340/825.5 X |
| 4,366,873 | 1/1983 | Levy et al. | 364/710 X |
| 4,412,326 | 10/1983 | Limb | 370/85 |
| 4,454,601 | 6/1984 | Helms et al. | 371/34 |
| 4,463,351 | 7/1984 | Chiarottino | 340/825.5 |

OTHER PUBLICATIONS

"Radio Terminal System" by T. Miyamoto et al., NEC Reasearch & Development No. 50, Jul. 1978, pp. 62–68.
Perq Packet Stream Network (Conference paper) Compcon 80 by Brian Rosen pp. 317–317A, Feb. 1980.
A Taxi Communication System (Conference Paper), IEEE Vehicular Technology by Billstrom, Mar. 27–30, 1979, pp. 307–314.

Primary Examiner—Charles E. Atkinson
Attorney, Agent, or Firm—Young & Thompson

[57] ABSTRACT

Method and device for radio telecommunication between a central station and a certain number of peripheral stations. In each station, a device 1 is connected to a radio transmitter-receiver 2 and comprises a keyboard 5 for introducing messages which are stored in a memory 15. A microprocessor 13 continuously tests the availability of the radio channel and automatically transmits the message as soon as the channel is free. Application to the operation of delivery or commercial-traveling network.

1 Claim, 14 Drawing Figures

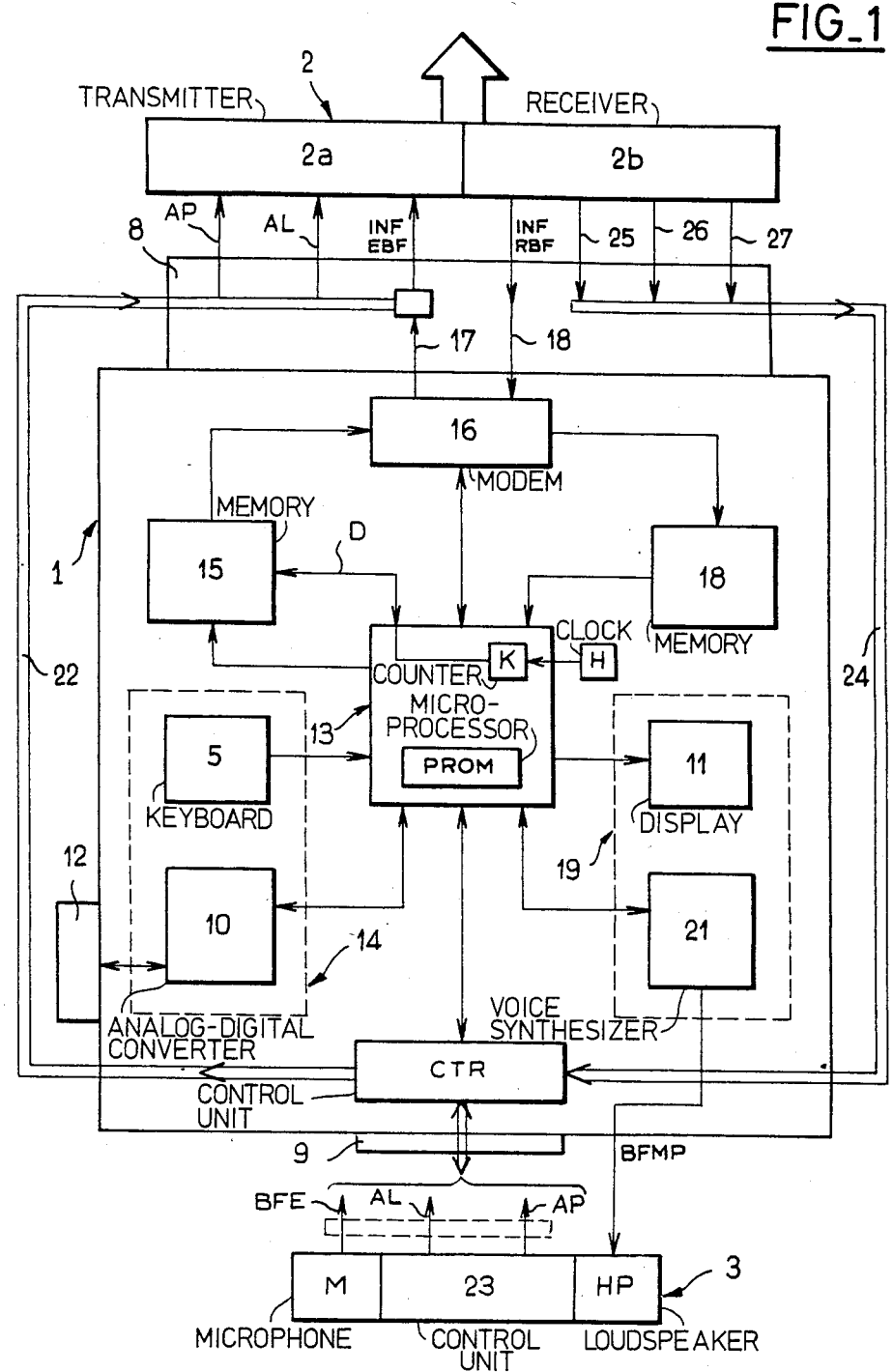
FIG_1

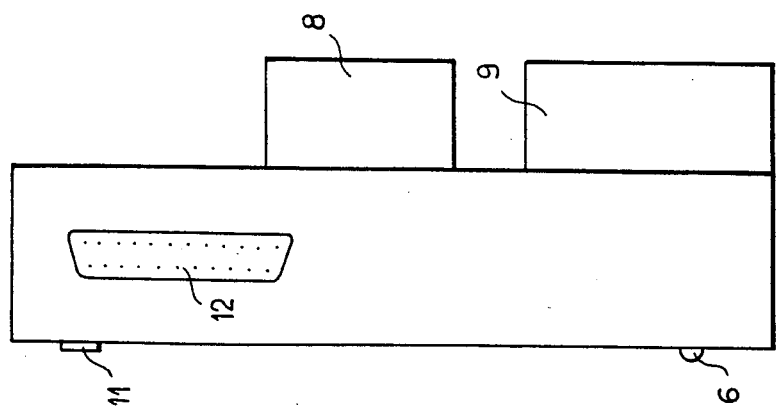
FIG_3
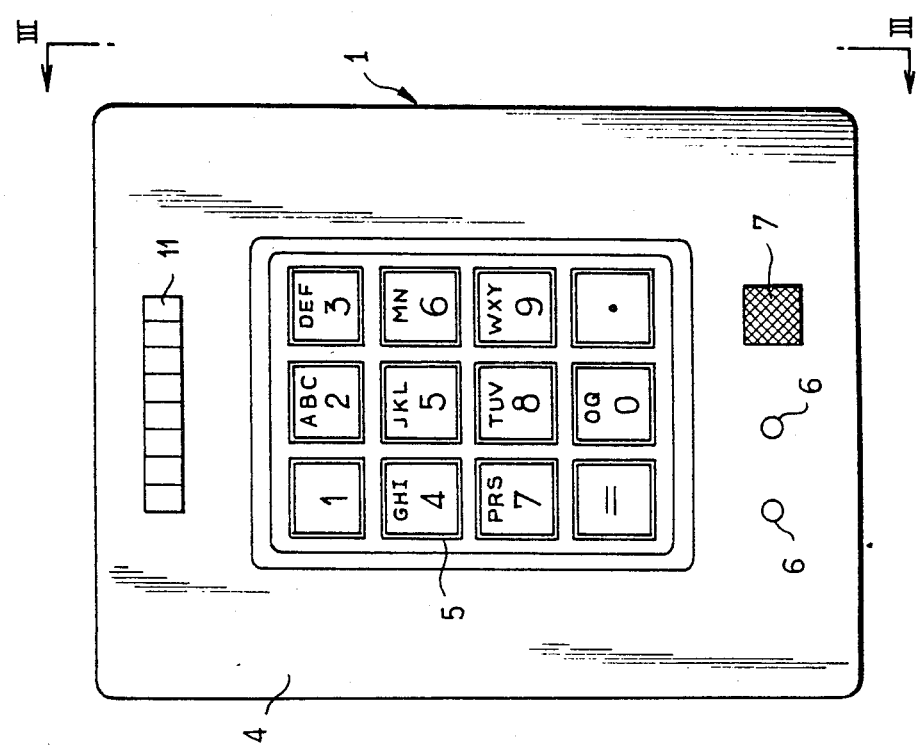
FIG_2

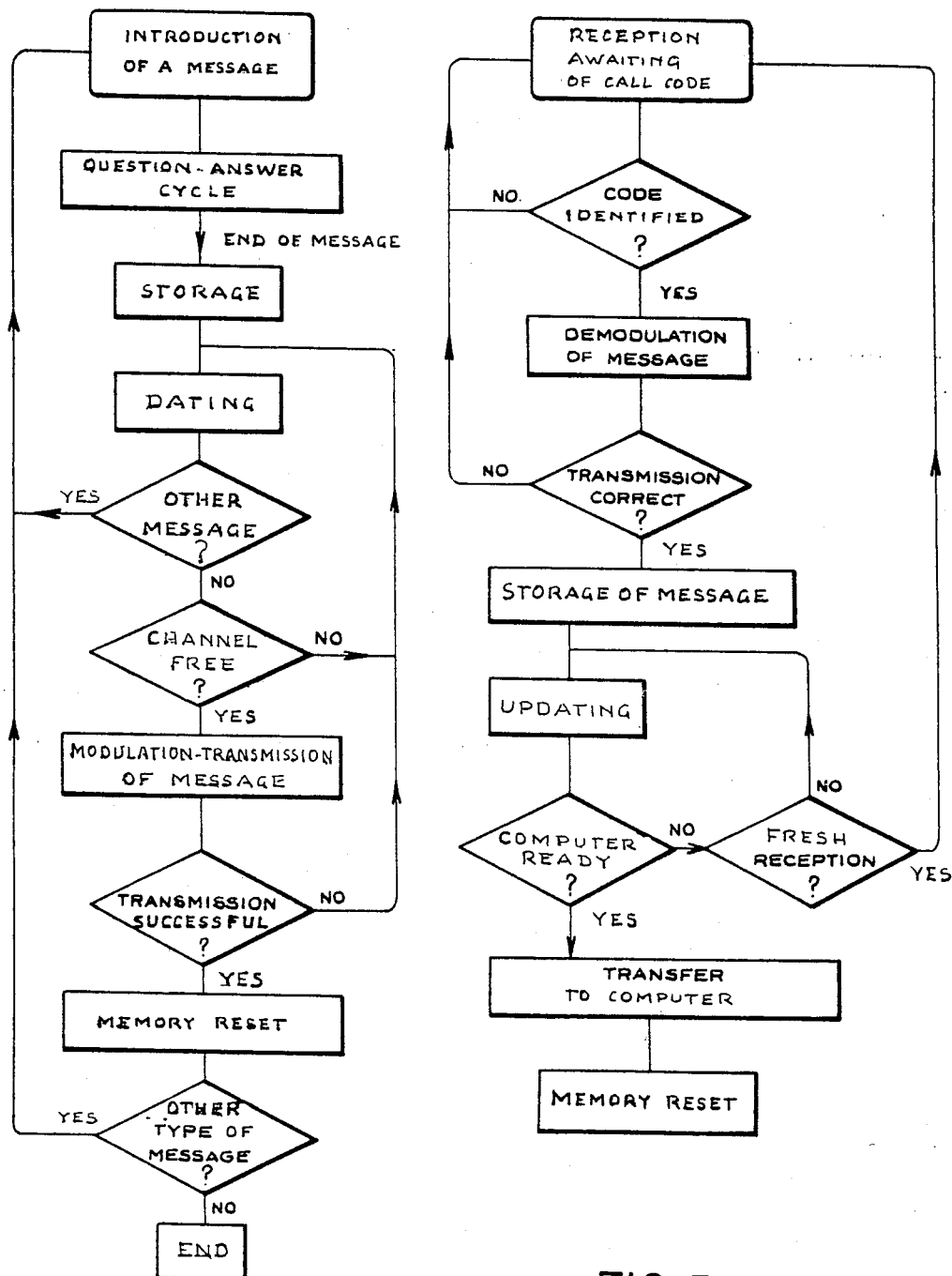

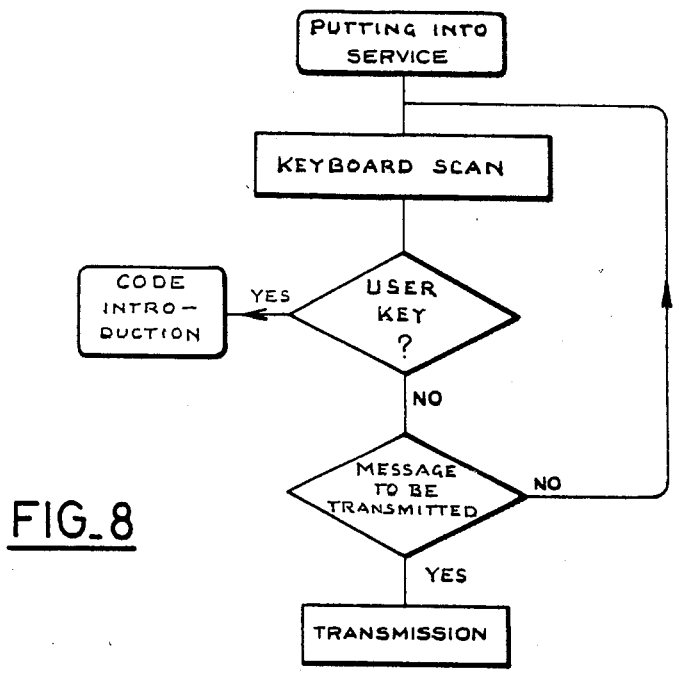
FIG_8
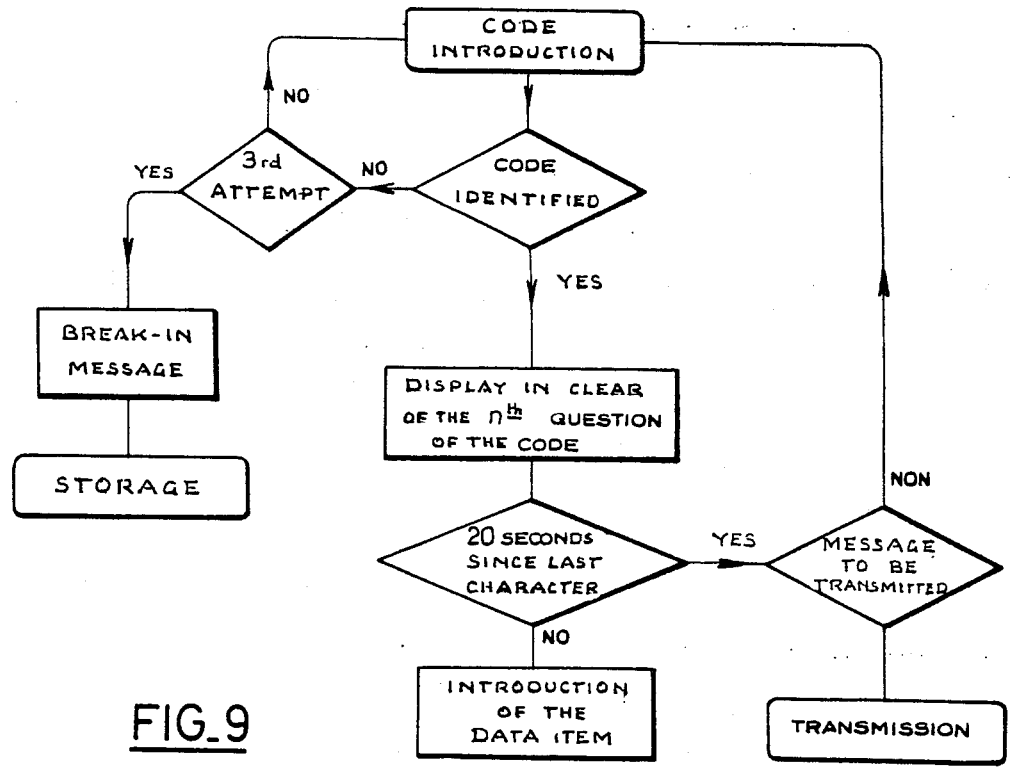
FIG_9

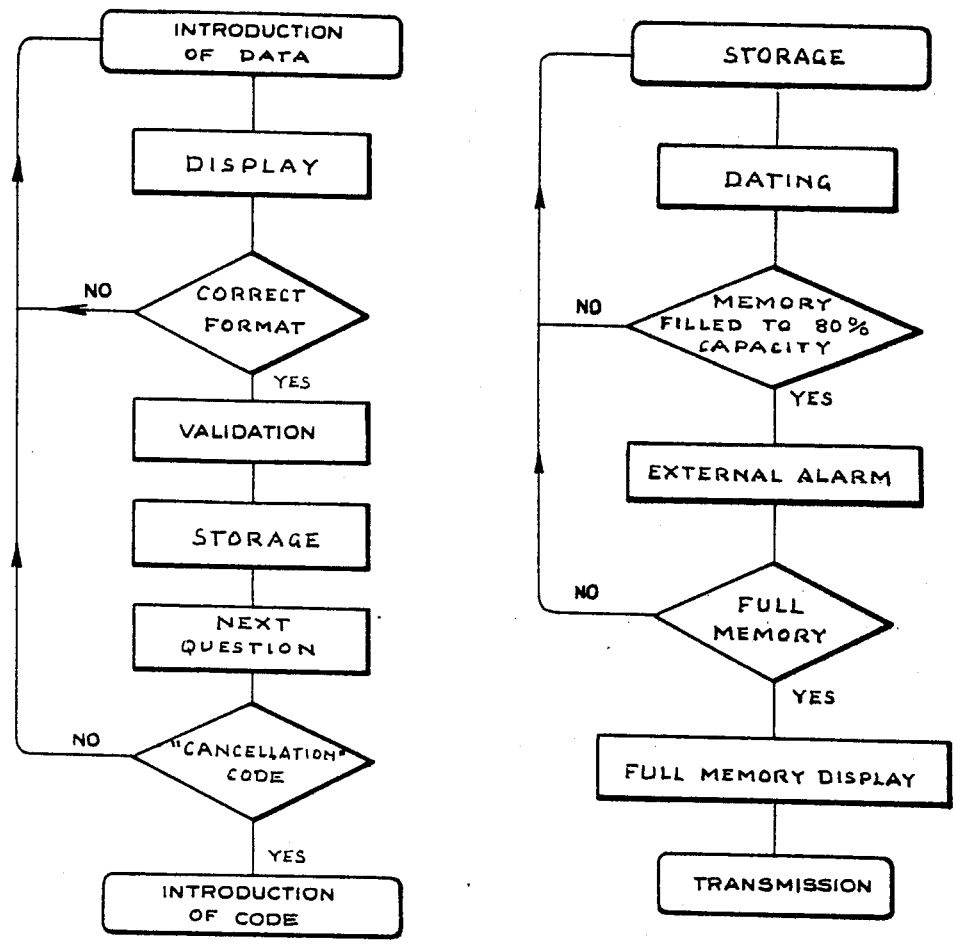
FIG_10  FIG_11
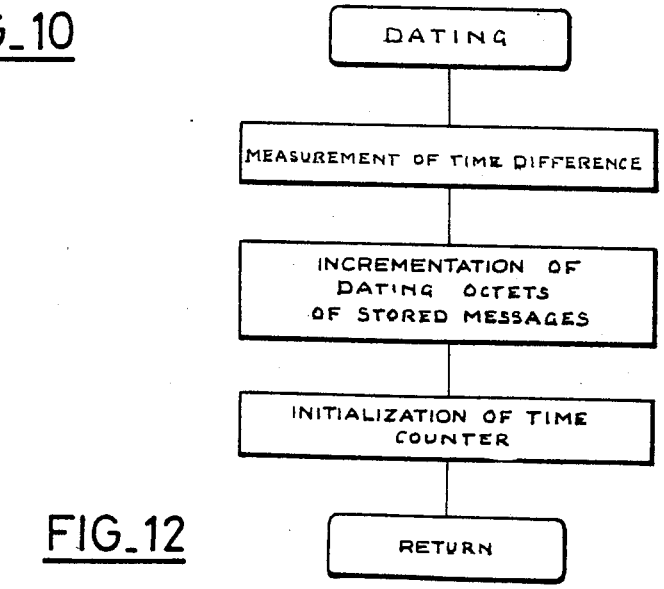
FIG_12

METHOD OF RADIO TELECOMMUNICATION AND DEVICE FOR IMPLEMENTATION THEREOF

The present invention relates to a method of radio telecommunication in the simplex mode or alternate duplex mode in which messages are exchanged at irregular instants between central stations and a certain number of secondary stations.

The invention also relates to a device for implementation of this method.

The methods and devices of the type contemplated are more precisely concerned with telecommunications by radiotelephone in the alternate mode and are employed mainly for establishing links between fixed central stations and a certain number of secondary stations located a board vehicles. This is the case, for example, of a network of commercial travelers who have to transmit urgent orders for products, especially fresh products, or a fleet of delivery vehicles which circuit is desired to be checked continuously. But the invention does not in any way exclude fixed secondary stations.

One of the difficulties of links of this type lies in the fact that the transmission channel is not always free, thus obliging the user to repeat his attempts, which results in a regrettable loss of time. The same difficulty arises if a central station which can be a management computer, for example, is temporarily employed for another task.

In order to facilitate the operator's work, devices have been proposed in which the message to be transmitted is stored in a memory, but that does not alter the fundamental problem of availability of the transmission channel.

Furthermore, local conditions of transmission may be poor, thus making the message unusable and obliging the user to repeat his transmission.

The same difficulties evidently affect two-way transmissions.

The object of the present invention is to provide a method and a device for telecommunication which free the user from any tedious need for waiting and repetition.

In the method contemplated by the invention, messages are exchanged at irregular instants between central stations and a certain number of secondary stations by storing in memory the message to be transmitted.

In accordance with the invention, this method is characterized in that availability of the radio channel is tested automatically and continuously and that the message is transmitted automatically when the channel is free.

Once the message has been introduced in memory, the user no longer needs to attend to his transmission. This latter takes place automatically as soon as the channel is subsequently free. As a function of the capacity of the memory, the user can even introduce a certain number of messages which will in some cases be checked on.

In a preferred embodiment of the method, the validity of the message received is checked and transmission of the message is repeated automatically if the reception is not correct.

Neither does the user need to worry about local or atmospheric conditions of transmission or to check the transmission while waiting for an acknowledgement of reception.

Preferably, the message received is stored in memory until the final receiver stage is made available.

For example, if this receiver is a large management computer occupied on a time-sharing basis, no waiting period is imposed.

In an avantageous embodiment of the method, there is added to the message at the instant of transmission a data item representing the time which has elapsed since the instant of introduction of the message.

As a complementary feature, up to the instant of reception by the final receiver stage, the data item representing the time which has elapsed since the instant of introduction of the message is updated.

Although the transmission in fact takes place in deferred time, a reconstitution of the real time is readily obtained.

In an improved embodiment of the method, after having recognized availability of the channel, transmission is retarded by a predetermined time interval corresponding to a transmission-priority hierarchy.

In accordance with a second aspect of the invention, the device for radio telecommunication in simplex mode or alternate duplex mode between central stations and a certain number of secondary stations for applying the method aforesaid is provided on each of said stations and comprises a connector for establishing a connection with a radio transmitter-receiver, a connector for establishing a connection with a microphone-loudspeaker assembly provided with controls for calling and alternate transmission, means for introducing a message to be transmitted, a transmission memory for storing this message, and means for signaling a message received. It is characterized in that it comprises a computation unit connected to the transmitter-receiver and to said memory for continuously testing the availability of the radio channel and for initiating transmission of the message only if the channel is free.

The device advantageously comprises a reception memory connected to the receiver and to the signaling means for storing the messages received as well as a clock pulse counter for measuring the time of residence of each message in memory.

In a preferred embodiment of the device, the means for introducing a message comprise a manual keyboard and/or an analog-to-digital converter coupled to a lead for connecting to a measuring probe, thus making it possible to transmit data without human intervention.

The means for signalling a message received comprise a visual display unit which can advantageously be duplicated by a voice synthesizer connected to the loudspeaker.

Other particular features and advantages of the invention will also be brought out by the following detailed description.

In the accompanying drawings which are given by way of non-limitative example:

FIG. 1 is an electrical block diagram of a device in accordance with the invention;

FIG. 2 is a front view of this device;

FIG. 3 is a view along III—III of FIG. 2;

FIGS. 4 to 14 represent schematically sequences of operation for explaining the method.

Figures 6, 7:
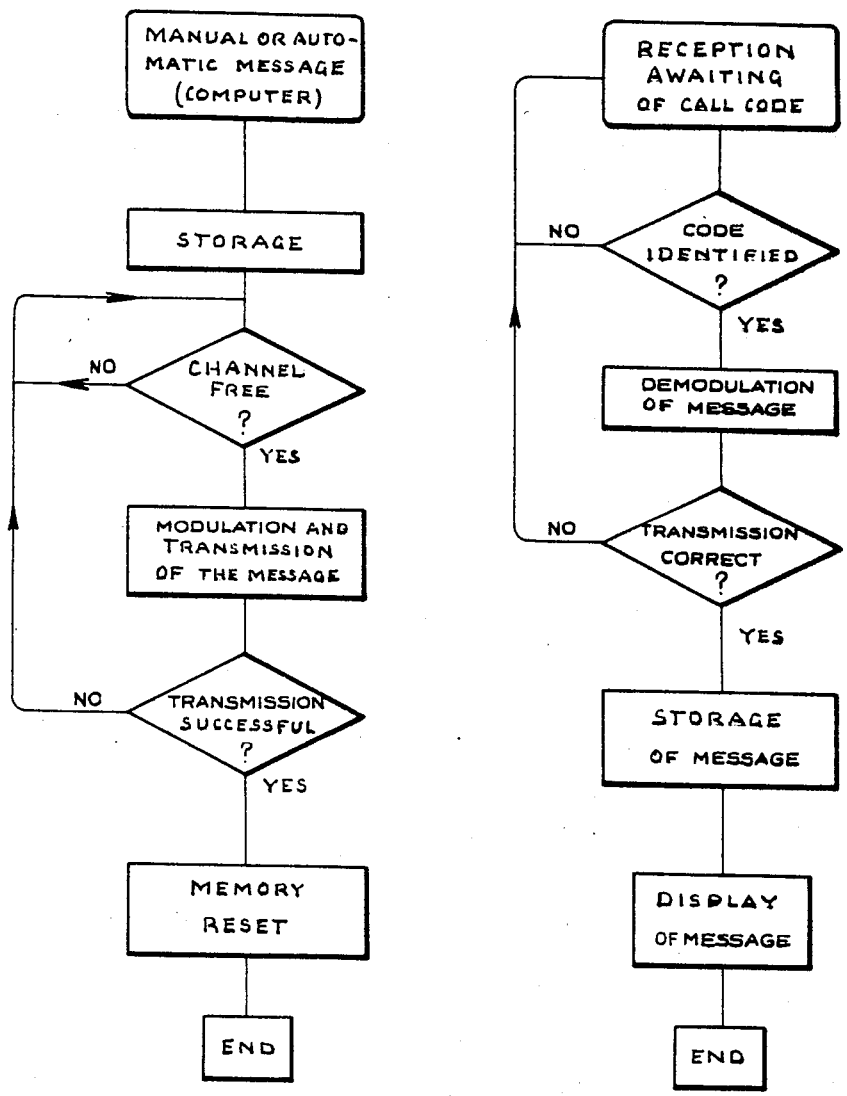

With reference to FIGS. 1 to 3, the device 1 in accordance with the invention is inserted between a transmitter-receiver stage 2 and a microphone-loudspeaker assembly 3.

The device proper is contained in a casing 4 (FIG. 2) on the front face of which is shown a keyboard 5 of the telephone type, warning indicator lamps 6 and a sound signal element 7. Socket outlets 8, 9 are provided on the rear side (FIG. 3) for the purpose of connecting respectively to the transmitter-receiver and to the microphone-loudspeaker assembly.

The apparatus is also provided on the front face with an alphanumeric luminous display device 11 and on the side with a connector 12, the function of which will be described hereinafter.

Referring more precisely to FIG. 1, the device 1 comprises a microprocessor 13 containing a PROM program memory and connected on one hand to a data introduction stage 14 and on the other hand to a transmission memory 15.

The data-introduction stage 14 includes the keyboard 5 and an analog-to-digital converter 10 which is connected to the connector 12 for establishing a connection with an external measuring probe.

The memory 15 is connected to the transmitter 2a through a modulator-demodulator (MODEM) 16 and through the socket outlet 8 via a line 17 for information transmitted at low frequency (INFEBF).

Similarly, a reception memory 18 is connected to the receiver 2b through the MODEM 16 via a line 18 for information received at low frequency (INFEBF). This memory is also connected to a stage 19 for indicating messages received via the microprocessor 13.

In addition to the display device 11, the stage 19 comprises a voice synthesizer 21, the output of which is connected via a line BFHP to the loudspeaker HP which forms part of the assembly 3.

This assembly 3 comprises a microphone M from which extends a low-frequency transmission line BFE. This line returns to the line 17 which terminates at the transmitter 2a via the socket outlet 9, via a control unit CTR and a multiwire cable 22 so as to return to the low-frequency information line 17.

The assembly 3 further comprises a control unit 23 from which extend call connections AP and alternate transmission connections AL which terminate via the same channel at the transmitter 2a.

The control unit CTR which is in a mutually dependent relationship with the microprocessor 13 receives via a multiwire cable 24 service data derived from the receiver 2b, namely a received-code data item 25, a free-channel data item 26 and a data item 27 indicating the presence of a low-frequency message which is intended for the loudspeaker.

The microprocessor 13 further comprises a counter K which counts the pulses of a clock H and is connected to the transmission memory 15 by means of a dating connection D.

Assuming that the device which has been described is installed on a secondary station, the user enters a message by means of the keyboard 5 and, via the microprocessor 13, this message is stored in the transmission memory 15 and dated. As soon as the free-channel information 26 is transmitted to the microprocessor by means of the control unit CTR, the contents of the memory are transmitted via the line 17 and the transmitter 2a with the addition of an item of information representing the time of residence in the memory 15; this item of information corresponds to the contents of the counter K.

In another mode of operation, analog data derived from a measuring probe connected to the connector 12 are digitized in the converter 10 and transmitted on receipt of an order from the microprocessor after a possible waiting period in memory.

At each instant, the user may communicate by radio by means of the calling and alternate transmission control unit 23.

The items of information transmitted by a central station are visualized on the display device 11 or communicated by voice by means of the loudspeaker HP via the synthesizer 21.

In the event that the device is installed in a central station, it is practically not modified except for certain details of programming of the microprocessor. The signal stage 19 is in that case connected to a final receiver stage which may be occupied at the moment of a transmission, with the result that the reception memory 18 plays an important part. When the message is finally transmitted to this stage, the time of residence in the memory 18 is added to the time of residence in the transmission memory of the secondary station which has sent the message.

The operating sequences will now be described in greater detail with reference to FIGS. 4 to 14 in order to give a more complete description of the method and to explain the programming of the microprocessor.

Consideration is given to the two modes of operation which are possible according to the station which takes the initiative of transmission:

A. From a secondary station

The operations relating to the secondary station are summarized in FIG. 4.

The initial operation is the entry of a message which normally takes place by way of programmed questions to which the user replies. Once the message has been entered, it is stored in memory and dated in accordance with the sub-sequences which will be described below in detail.

If there are other messages to be introduced in accordance with the same cycle of questions-answers, one returns to the beginning or, if not, one endeavors to transmit whenever the radio channel is free. As long as the channel is not free, one returns in order to carry out updating.

Transmission takes place in accordance with a procedure which will be described below in detail. In the event of faulty transmission, one returns to the dating operation.

After transmission, the message is erased from the memory and one may change if necessary to another type of message to which a different question-answer procedure is applicable.

The corresponding operation of a central station (FIG. 5) consists in identifying its call code, in demodulating the message and in storing it in memory as soon as the transmission is found to be correct. Updating is carried out by adding the time of residence in the reception memory and, as soon as the final receiver computer is available, the message is transferred thereto and the memory is erased.

If the computer is not available, one returns to the dating operation unless another message appears for the purpose of being demodulated and stored in memory.

B. From a central station

A message entered manually or automatically at a central station (FIG. 6) is first stored in memory, then transmitted as soon as the channel is free. After checking for correct transmission, the memory is reset to zero.

In correspondence (FIG. 7), the secondary station identifies its call code and demodulates the message which is stored in memory only after checking for correct transmission.

The message is then indicated on the display device 11.

Normally, no provision is made in this case for dating since the real time of the instructions transmitted by a central station is a priori of no interest.

C. Sub-sequences.

The initial operation (FIG. 8) described here with reference to the secondary station consists in putting the apparatus into service, which initiates scanning of the keyboard. The user must then introduce his personal key. If this is not done, the apparatus will be limited to transmission of the message (or the messages) which may have remained stored in the transmission memory.

The user then enters a code which defines a cycle of questions-answers.

The introduction of the code is shown in detail in FIG. 9. If the code is erroneous, after three attempts, a break-in message is transmitted.

Once the code has been identified, the questions are displayed successively and the user answers them by introduction of the data. An interruption of 20 seconds in the key entry of data puts the apparatus in the transmission state and the data are cancelled.

The introduction of data is represented in detail in FIG. 10. The key-entered data are displayed and checked in their format. They have to be validated by depressing a push-button. They are then stored in memory and one passes to the next question. Pressure exerted on a "cancellation" button makes it possible to change to a different cycle of questions-answers materialized by another code to be introduced.

The storage operation is shown in detail in FIG. 11. This operation includes a dating operation which starts up a time-counting operation relating to the message which has just been introduced and which updates the messages stored previously and not yet transmitted (FIG. 12). This general updating takes place not only at the time of storage of a new message but also at each transmission.

Each stored message contains:
its code;
the question (or the questions);
the data;
the dating operation;
identification of the station;
the length of the message.

The user is informed of the state of filling of the memory. When this latter is full, the device necessarily changes over to transmission.

Figures 13, 14:
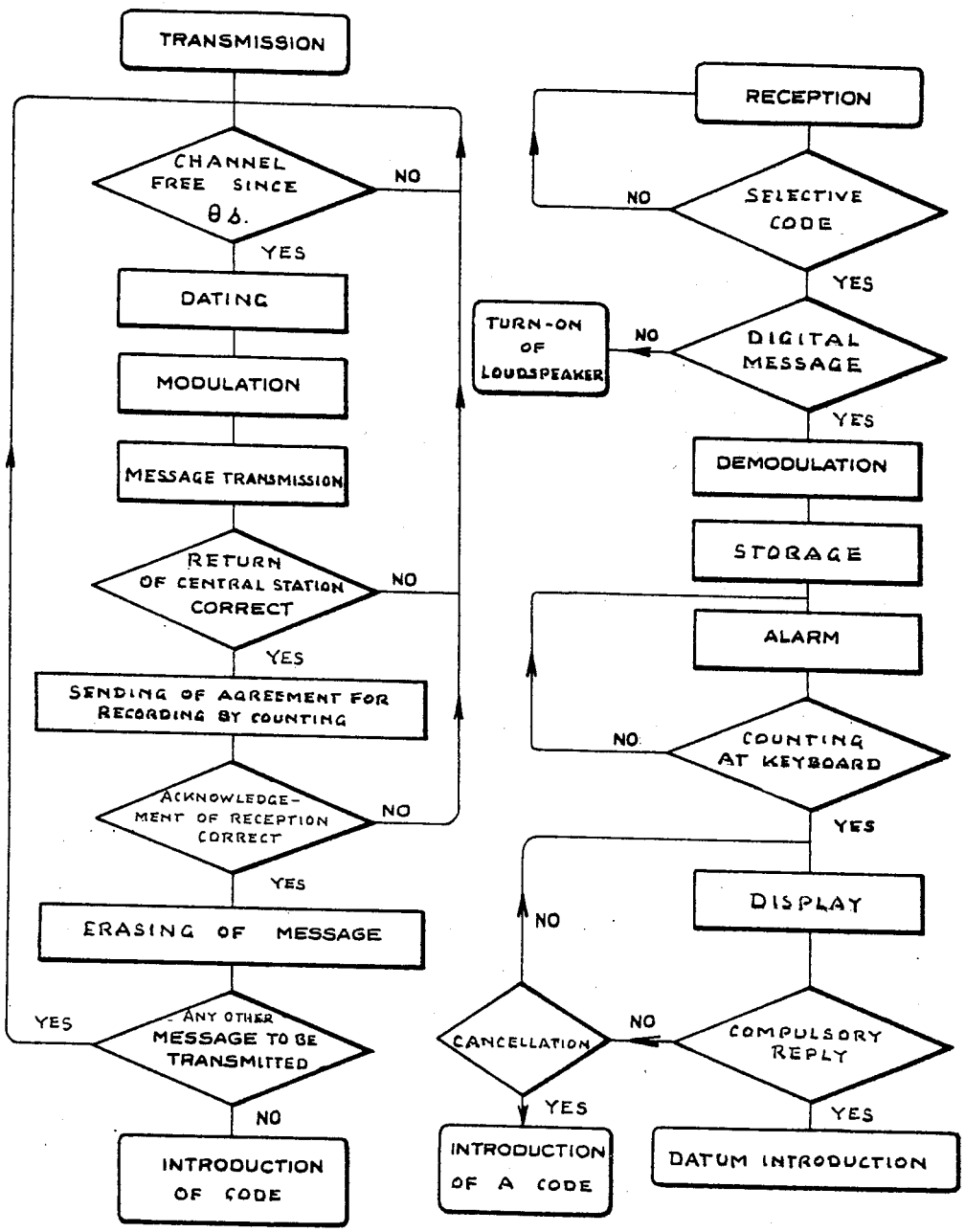

There will now be described in detail, with reference to FIGS. 13 and 14, the sequence of operations of transmission from a secondary station and the sequence of operations of reception by the same secondary station.

Before each transmission, one waits for a certain time $\theta$ which is different for each secondary station in order to define a scale of priority between these stations. Final updating is then performed in regard to the message awaiting time at the secondary station.

After modulation and transmission, the central station repeats the message. If this return is correct, one sends an agreement to validate the message at the level of the final receiver. If this agreement itself is correct, the message is erased from the transmission memory and one proceeds to the next message. The set of data in memory is in fact divisible and it is preferable to transmit by fraction by reason of the random character of radio transmission incidents.

At the end of transmission, one reverts to the code introduction position.

The reception of a message by the secondary station (FIG. 14) first consists of identification of the personal code of this station, then identification of the nature of the message (digital or phonic). The digital message is demodulated and stored in the reception memory. Its arrival is announced by a sound signal.

The user then requests display by actuating the keyboard. If an answer is compulsory, one changes to the data introduction position. If not, the message remains displayed until the cancellation button is actuated.

By way of example of utilization of the invention, mention can be made of the operation of a concrete mixing plant. Movements of trucks are frequent and incidents may be numerous. The various changes of state are communicated manually by the driver or automatically by analog probes (for example the gasoline consumption of the truck). The plant is thus in a position to determine at each instant the state of each vehicle and the progress of each construction site. The plant can accordingly optimize its production and accelerate billing. And these advantages are obtained with a minimum loss of time for the deliveryman. In this example of application, the presence of the voice synthesizer at the secondary station is very useful.

Another example is that of the distribution of fresh products in which speed of transmission from a network of commercial travelers is of primary importance. Aside from the orders transmitted by the secondary station, the central station can rapidly deliver messages such as beginnings or ends of sales promotion campaigns or a stock failure. Furthermore, by virtue of the digitization process, discretion is ensured.

One can also mention the example of management of a network of taxicabs.

As can readily be understood, the invention is not limited to the examples described but covers any alternative form within the scope of anyone versed in the art.

Thus the converter 10 could provide for two-way information transfer, for example in order to exert an analog control on an external element. It could also be designed to perform the function of a transparent interface for receiving via the socket outlet 12 "series" items of information which are already in digital form.

We claim:

1. A device for radio telecommunication in the simplex mode or in the alternate duplex mode between central stations and a certain number of secondary stations, this device being provided in each of said stations and comprising a transmitter-received stage (2), a microphone-loudspeaker assembly (3), connectors (8,9) for connecting respectively to the transmitter-receiver and to the microphone-loudspeaker assembly, an alphanumeric luminous display device (11), a microprocessor (13) containing a PROM program memory and connected on the one hand to a data introduction stage (14) and on the other hand to a transmission memory (15) connected to the transmitter (2a) of said transmitter-receiver stage (2) through a modulator-demodulator (MODEM) (16) and through a said connector (8) via a line (17) for information transmitted at low frequency (INFEBF), a reception memory (18) connected to the receiver (2b) of said transmitter-receiver stage (2)

through the MODEM (16) via a line (18) for information received at low frequency (INFEBF), said reception memory (18) being also connected to a stage (19) for indicating messages received via the microprocessor (13) and comprising a voice synthesizer (21), the output of which is connected via a line BFHP to the loudspeaker HP of said microphone-loudspeaker assembly (3), said assembly (3) comprising further a microphone M from which extends a low-frequency transmission line BFE which returns to the line (17) which terminates at the transmitter (2a) via another said connector (9), via a control unit CTR and a multiwire cable (22) so as to return to the low-frequency information line (17), said assembly (3) also comprising a control unit (23) from which extend call connections AP and alternate transmission connections AL which terminates via the same channel at the transmitter (2a), said control unit CTR being in a mutually dependent relationship with the microprocessor (13) and receiving via a multiwire cable (24), service data derived from the receiver (2b), namely a received-code data item (25), a free-channel data item (26) and a data item (27) indicating the presence of a low-frequency message which is intended for the loudspeaker, said microprocessor (13) further comprising a counter K which counts the pulses of a clock H and is connected to the transmission memory (15) by means of a dating connection (D).

* * * * *